US011995832B2

(12) United States Patent
Richiardi et al.

(10) Patent No.: US 11,995,832 B2
(45) Date of Patent: May 28, 2024

(54) METHOD AND SYSTEM FOR CHARACTERIZING AN IMPACT OF BRAIN LESIONS ON BRAIN CONNECTIVITY USING MRI

(71) Applicant: SIEMENS HEALTHINEERS AG, Erlangen (DE)

(72) Inventors: Jonas Richiardi, Geneva (CH); Tobias Kober, Lausanne (CH); Veronica Ravano, Pully (CH)

(73) Assignee: Siemens Healthcare GmbH, Erlangen (DE)

( * ) Notice: Subject to any disclaimer, the term of this patent is extended or adjusted under 35 U.S.C. 154(b) by 208 days.

(21) Appl. No.: 17/375,169

(22) Filed: Jul. 14, 2021

(65) Prior Publication Data

US 2022/0020154 A1    Jan. 20, 2022

(30) Foreign Application Priority Data

Jul. 15, 2020    (EP) .................................... 20185853

(51) Int. Cl.
*G06T 7/11*    (2017.01)
*G06T 7/00*    (2017.01)

(52) U.S. Cl.
CPC .............. *G06T 7/0016* (2013.01); *G06T 7/11* (2017.01); *G06T 2207/10028* (2013.01); *G06T 2207/10088* (2013.01); *G06T 2207/30016* (2013.01); *G06T 2207/30096* (2013.01)

(58) Field of Classification Search
CPC .................................................... G06T 7/0016
See application file for complete search history.

(56) References Cited

U.S. PATENT DOCUMENTS

2016/0220168 A1*   8/2016   Port ..................... A61B 5/0042
2020/0380687 A1*  12/2020   Avital ................. A61B 8/5207

OTHER PUBLICATIONS

A. Jeurissen. "Difussion MRI Fiber Tractography of the brain" Wiley, DOI: 10.1002/nbm.3785. Feb. 2017. (Year: 2017).*
Barbieri et al (NPL "Atlas-based fiber reconstruction from diffusion tensor MRI data", DOI 10.1007/s11548-012-0774-6, Jan. 10, 2012, pp. 9). (Year: 2012).*
Krzywinski et al.—2009—Circos: An information aesthetic for comparative genomics, Genome Research; Vancouver, British Columbia Canada; p. 1639-1645; 2009.

(Continued)

*Primary Examiner* — Oneal R Mistry
(74) *Attorney, Agent, or Firm* — Laurence A. Greenberg; Werner H. Stemer; Ralph E. Locher (57) ABSTRACT

A system and a method for mapping lesions or damage instances of a brain. The method includes receiving a lesion segmentation mask for the brain and receiving a tractography atlas. A connectivity damage brain map is constructed from (i) superimposing the lesion segmentation mask and a tractography atlas-based image, and (ii) combining information from the lesion segmentation mask with information from the tractography atlas-based image. The tractography atlas-based image is an image obtained from the tractography atlas, and the tractography atlas-based image and the lesion segmentation mask are registered to a common space.

6 Claims, 4 Drawing Sheets

(56) References Cited

OTHER PUBLICATIONS

Azevedo et al., "Thalamic Atrophy in Multiple Sclerosis: A Magnetic Resonance Imaging Marker of Neurodegeneration throughout Disease", 2017, p. 223-234; vol. 83 No. 2, San Francisco, CA.

Cordani et al., Imaging correlates of hand motor performance in multiple sclerosis: A multiparametric structural and functional MRI study; Mulrtiple Sclerosis MSJ Journal; 2018, p. 1-12, Milan, Italy.

Charil et al., Statistical mapping analysis of lesion location and neurological disability in multiple sclerosis: application to 452 patient data sets; Academic press; 2003, p. 532-544, McConnell Brain Imaging Centre, Montreal Neurological Institute, McGill University, Montreal, Canada Department of Mathematics and Statistics, McGill University, Montreal, Canada.

Vellinga et al., Clinical Correlations of Brain Lesion Distribution in Multiple Sclerosis, Journal of Magnetic Resonance Imaging, 2009, p. 768-773, Wiley-Liss, Inc.

Riahi et al., Improved correlation between scores on the expanded disability status scale and cerebral lesion load in relapsing-remitting multiple sclerosis, Brain, 1998, p. 121, 1305-1312; Oxford University Press, Montreal Canada.

Tao et al.—2009—Deep gray matter atrophy in multiple sclerosis: A tensor based morphometry, Journal of the Neurological Sciences; Available online Jan. 24, 2009; p. 39-46, Journal of the Neurological Sciences 282, Houston, TX.

Rudick et al. and the Multiple Sclerosis Collaborative Research Group, Use of the brain parenchymal fraction to measure whole brain atrophy in relapsing-remitting MS; 1999, p. 1698-1704, Neurology, Cleveland, OH.

Hübner et al., The connectomics of brain demyelination: Functional and structural patterns in the cuprizone mouse model, 2016, p. 1-18, vol. 146, NeuroImage, XP029917431.

Yeh et al., Population-Averaged Atlas of the Macroscale Human Structural Connectome and Its Network Topology, 2018, p. 57-68, vol. 178, NeuroImage, Pittsbrugh, PA, XP085428312.

Bodini et al., T2 lesion location really matters: A 10 year follow-up study in primary progressive multiple sclerosis, 2011, p. 72-77, Journal of Neurol Neusurg Psychiatry, London, UK.

Reich et al., Automated vs. conventional tractography in muliple sclerosis: Variability and correlation with disability, 2010, p. 3047-3056, vol. 49, NeuroImage, Baltimore, MD.

* cited by examiner

MNI152 T1w
2009a

METHOD AND SYSTEM FOR CHARACTERIZING AN IMPACT OF BRAIN LESIONS ON BRAIN CONNECTIVITY USING MRI

CROSS-REFERENCE TO RELATED APPLICATION

This application claims the priority, under 35 U.S.C. § 119, of European patent application EP 20 185 853.7, filed Jul. 15, 2020; the prior application is herewith incorporated by reference in its entirety.

BACKGROUND OF THE INVENTION

Field of the Invention

The present disclosure is directed, in general, to imaging techniques for imaging biological objects, such as tissue, using magnetic resonance imaging (MRI). More specifically, the present invention pertains to methods and systems for characterizing an impact of brain lesions on brain connectivity, for example, for characterizing structural disconnectomes or white matter tract damage resulting from brain lesions, using MRI.

Early diagnosis and accurate prognosis (i.e., the prediction of a patient's future disease progression) are key elements for treatment planning and to ensure effective patient care in neurodegenerative disorders such as multiple sclerosis (MS): a highly disabling neurodegenerative disease that affects young adults with a high prevalence in northern countries. The establishment of accurate early diagnosis and prognosis is often made difficult by the heterogeneity of the disease. In today's clinical routine for MS diagnosis, radiologists evaluate the lesion load, i.e., the number of lesions visible in MRI scans, to diagnose and monitor disease evolution. However, the lesion load does not necessarily reflect the severity of clinical symptoms and disability: patients with a high lesion load are not systematically more severely disabled than patients with lower lesion load. This leads to the so-called 'clinico-radiological paradox', i.e., the widely known fact that radiological findings do not, or not fully, explain the clinical symptoms.

To fill this gap, other more informative measurements (or 'imaging biomarkers') could be extracted from MRI scans in addition to lesion load. In biomedical research, the use of diffusion imaging, a subtype of MR imaging, has shown a great potential in characterizing neurological disorders in a more complete manner. For instance, previous studies in multiple sclerosis have shown how structural brain connectivity (which can be estimated from diffusion imaging sequences) is affected in patients, therefore suggesting the potential of quantifying brain connectivity to fill the clinico-radiological gap. Moreover, diffusion imaging can also help to better understand whether a certain position of a lesion inside the brain causes a certain symptom. To this end, one can extract the main connection pathways in the brain (so-called white matter tracts) which are typically associated to determined brain function, and estimate the damage that results from lesions. It should be noted that similar rationales work also for other neurodegenerative diseases (Parkinson's Disease, cerebral small vessel disease, Huntington's Disease).

Advanced diffusion imaging necessary to track neural pathways, however, is typically not part of clinical routine protocols. This limits considerably the information that can be extracted from MRI scans, including brain connectivity and white matter tract damage. Last but not least, connectivity analysis outcome is highly dependent on MRI acquisition parameters, the image reconstruction, as well as on the tracking algorithm used, leading to a considerable variability. In patients, the presence of lesions can also interfere with tractography results, leading to many pitfalls in terms of interpretability, especially in quantitative analyses.

In the past years, imaging biomarkers have been investigated to help solving the clinico-radiological paradox:

Some studies were notably related to lesion location. For instance, different studies have shown that lesion likelihood in periventricular white matter correlated significantly with clinical scores [1, 2]. Other studies investigated the lesion location specifically in different white matter tracts. In 1998, a study on 39 patients showed that lesion load on the manually delineated cortical spinal tract correlated better with the standard score describing the severity of MS (expanded disability status scale, EDSS) than total lesion load [3]. In another research, authors used the time before bilateral support was required to walk as a disability metric to be correlated with the lesion load in major motor and associative tracts. A significant correlation was found between disability and voxel-wise lesion probability in the corticospinal tract, the superior longitudinal fasciculus and the right inferior fronto-occipital fasciculus [4]. However, these studies are always limited to some specific white matter tracts.

Other studies were related to brain atrophy. For instance, the brain parenchymal fraction has been proposed in 1999 as a metric for brain atrophy [5] showing the relevance of tissue degeneration quantification for the diagnosis and the follow-up of the disease. Since then, morphometry of the main brain substructures has become a topic of interest in the field of neurodegenerative diseases such as MS. To illustrate, thalamic atrophy was shown to develop faster in MS patients than in healthy controls [6] and to significantly correlate with EDSS [7], together with the atrophy of the caudate and the putamen. Another study found correlation between the EDSS and the atrophy of the cerebellum, the temporal lobe and the putamen [8].

Extraction of brain connectivity metrics that are known in the art still require the acquisition of diffusion imaging, which limits considerably an implementation in clinical routine protocols due to time limits (additional MRI acquisition) and economic constraints.

BRIEF SUMMARY OF THE INVENTION

It is an object of the present invention to find a method and a system that mitigate the clinico-radiological paradox, enabling the inclusion of brain connectivity analysis in clinical workflows, preferably without requiring extended diffusion imaging nor individual tractography.

With the above and other objects in view there is provided, in accordance with the invention, a computer-implemented method for mapping connectivity breaks, or damage instances of a brain, the method comprising:
  receiving a lesion segmentation mask for the brain;
  receiving a tractography atlas;
  constructing a connectivity damage brain map by:
    superimposing the lesion segmentation mask and a tractography atlas-based image; and
    combining information from the lesion segmentation mask with information from the tractography atlas-based image;
  wherein the tractography atlas-based image is an image obtained from the tractography atlas, and wherein the tractography atlas-based image and the lesion segmentation mask are registered to a common space.

In other words, the object of the invention is achieved by a method and a system for characterizing the impact of brain lesions on brain connectivity, notably by measuring or mapping the latter through structural disconnectomes and/or white matter tract damage, using MRI according to the object of the independent claims. Dependent claims present further advantages of the invention.

Compared to existing techniques, the claimed objects present the advantage of being free of an acquisition of a diffusion image and/or tractography for the biological object, i.e. the brain, to be imaged/under analysis.

Indeed, instead of acquiring diffusion images, the present invention proposes to use an atlas-based approach to extract connectivity measures from MR images without requiring any diffusion imaging for the object under analysis.

The present invention concerns a computer-implemented method for mapping instances of connectivity damage to a brain, e.g., for mapping or characterizing structural disconnectomes of a brain, or for mapping an estimation of white matter tract damage for the brain. Once more, the method comprises: generating or receiving a lesion segmentation mask (also referred to as "lesion mask" hereafter) for said brain; generating or receiving a tractography atlas; constructing a connectivity damage brain map from (i) superimposing the lesion segmentation mask and a tractography atlas-based image, wherein the lesion segmentation mask and the tractography atlas-based image are spatially registered to a common space, and from (ii) combining information from the lesion segmentation mask with information from the tractography atlas-based image, wherein said tractography atlas-based image is an image obtained or extracted from the tractography atlas.

The present invention concerns also a system for mapping, preferably automatically, connectivity damage in a brain. The system comprises:
 a first interface for receiving or acquiring a lesion segmentation mask for said brain; the first interface may be connected to an MRI (magnetic resonance imaging) apparatus for acquiring images of the brain;
 a memory for storing the lesion segmentation mask;
 a second interface, which may be the same as the first interface, which is configured for acquiring or receiving a tractography atlas;
 a control unit comprising a processor, the control unit being configured for spatially registering the lesion segmentation mask and a tractography atlas-based image to a common space, said spatial registration being preferentially automatic, the control unit being further configured for automatically constructing a connectivity damage brain map from superimposing the lesion segmentation mask and said tractography atlas-based image, and combining information from the lesion segmentation mask with information from the tractography atlas-based image, wherein said tractography atlas-based image is an image obtained or extracted from the tractography atlas; and
 a display connected to the control unit and configured for displaying the obtained connectivity damage brain map.

Preferably, the lesion segmentation mask is a three-dimensional (3D) lesion segmentation mask based on a segmentation of lesions for the whole brain. The lesion segmentation mask is obtained using techniques that are known in the art. For instance, MRI scans (i.e. data) of said brain might be acquired, wherein said MRI scans are configured for providing brain images comprising lesions of said brain. In particular, said MRI scans might be acquired, by means of an MRI apparatus, using conventional T2-weighted and optionally, if available, T1-weighted MRI sequences, both of which can be either acquired with or without contrast agent and in 2D or 3D. Then, a lesion segmentation can be performed on each of the acquired brain images in order to identify, in each of said brain images, brain regions comprising lesions. Based on said segmentation, a lesion mask might be created for the whole brain. Typically, the lesion mask may include multiple lesions.

When spatially registering the lesion mask and the tractography atlas-based image to a common space, said common space might be for instance a standard space such as MNI space. The spatial registration according to the invention is configured for enabling a superimposition of the lesion mask and the tractography atlas-based image. Notably, in the case of characterizing structural disconnectomes of a brain, the tractography atlas-based image is preferentially the tractography atlas itself, i.e. the whole brain tractogram provided by the tractography atlas, and therefore said spatial registration is configured for enabling a superimposition of the lesion mask onto the tractography atlas. The common space might be the space of the tractography atlas itself, in which case only the lesion mask needs to be registered to said common space. At the opposite, it might be possible to choose the (patient) brain space as common space and to register then the tractography atlas to said brain space. Said tractography atlas is preferentially a publicly available atlas built from averaged diffusion MRI data of healthy subjects. Such a publicly available tractography atlas is for instance provided by Yeh et al. [10]. The tractography atlas provides said whole brain tractogram, i.e. a mathematical model of brain structural connectivity composed of streamlines, wherein each streamline is configured for modeling a path followed by a fascicle of brain neuronal axons. Preferentially, the tractography atlas also provides individual white matter tracts tractograms, for instance one for each tract.

Preferably, for characterizing structural disconnectomes of a brain, the "constructing" step of the computer-implemented method comprises the following steps performed by the control unit according to the invention:
 superimposing the lesion segmentation mask onto said tractography atlas, wherein combining information from the lesion segmentation mask with information from the tractography atlas comprises identifying from the latter streamlines intersecting, i.e. passing through, the lesion mask, the identified streamlines being called hereafter "affected streamlines". In particular, for identifying the affected streamlines, the present invention proposes to determine, for each voxel in the lesion mask (i.e. where lesions are) whether there is a streamline that passes through an equivalent voxel in the tractography atlas image, wherein a streamline that passes through voxels representing lesions in the lesion masks is identified as 'affected';
 segmenting a 3D image of said brain using a parcellation atlas, e.g. a whole-brain parcellation atlas, wherein the parcellation atlas is configured for partitioning the brain into distinct brain subregions, e.g. functional brain subregions, wherein said 3D image is obtained from said MRI scans of said brain, wherein the parcellation atlas and 3D image are registered to said common space, and identifying the brain subregions interconnected via at least one or at least a predefined number of said affected streamlines, and determining for each identified interconnected subregions the number of affected streamlines interconnecting said identified interconnected subregions. In particular, said identification of the brain subregions comprises:

extracting from the tractography atlas and for each streamline, which brain voxels are crossed by the streamline;

extracting from the parcellation atlas and for each subregion, the voxels that belong to said subregion; and for each streamline and from the voxels extracted from the parcellation atlas, determining the brain subregion each voxel crossed by said streamline belongs to.

In other words, the system determines from the parcellation atlas the subregion to which each voxel crossed by a streamline belongs to. Then, if voxels crossed by a streamline belong to subregions A and B, then said streamline is identified by the system as connecting regions A and B. The system according to the invention, namely its control unit, applies the same process to each streamline, and automatically counts the number of streamlines connecting each couple of regions, e.g. regions A and B;

constructing a disconnectome graph, wherein said disconnectome graph is modelled as a brain graph comprising vertices and edges, wherein vertices represent the identified brain subregions and whose edges represent said number of affected streamlines connecting one of said subregions to another one of said subregions;

optionally, grouping said subregions into main brain lobes (e.g. temporal, frontal, parietal, occipital, subcortical, limbic, insular and cerebellum), and calculating for each main brain lobe a first number that is the number of affected streamlines connecting the considered main lobe to another main lobe, and a second number that is the number of streamlines that would connect said considered main lobe to said another main lobe for a population-averaged structural connectome obtained from said tractography atlas, and automatically displaying the relative percentage of the first number with respect to the second number.

Preferentially, for mapping an estimation of white matter tract damage for the brain, the "constructing" step of the computer-implemented method comprises the following steps performed by the control unit according to the invention:

extracting, for each white matter tract composing said tractography atlas, a brain white matter tract density image (TDI), wherein a tract density is defined as a number of streamlines per brain voxel. Each TDI defines thus for a white matter tract a set of voxels, wherein each voxel is characterized by the number of streamlines passing through the latter;

spatially registering each extracted TDI onto said common space, wherein said common space is preferentially the brain native space: in this case, each extracted TDI might be registered to the space of the (non-registered) lesion mask;

superimposing each spatially registered TDI on the lesion mask obtained for said brain in order to identify voxels of the TDI affected by a lesion, i.e. voxels belonging to overlapping regions;

determining, from the superimposition, a percentage of a lesioned tract and/or a volume of a lesioned tract, wherein the percentage of a lesioned tract is defined as the ratio between the sum over the affected voxels of the tract density for the considered voxel, and the sum over the set of voxels of said tract of the tract density for the considered voxel, and the volume of a lesioned tract is defined as the sum over the affected voxels of the tract density for the considered voxel times the volume of the considered voxel;

creating a map of the obtained percentage and/or volume of lesioned tract, notably in order to represent affected functional systems.

Other features which are considered as characteristic for the invention are set forth in the appended claims.

The foregoing has broadly outlined the features and technical advantages of the present disclosure so that those skilled in the art may better understand the detailed description that follows. Additional features and advantages of the disclosure will be described hereinafter that form the object of the claims. Those skilled in the art will appreciate that they may readily use the concept and the specific embodiment disclosed as a basis for modifying or designing other structures and systems for carrying out the same purposes of the present disclosure. Those skilled in the art will also realize that such equivalent constructions do not depart from the spirit and scope of the disclosure as defined by the set of claims.

The construction and method of operation of the invention, together with additional objects and advantages thereof will be best understood from the following description of specific embodiments when read in connection with the accompanying drawings.

DETAILED DESCRIPTION OF THE INVENTION

FIGS. 1 to 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Figure 1:
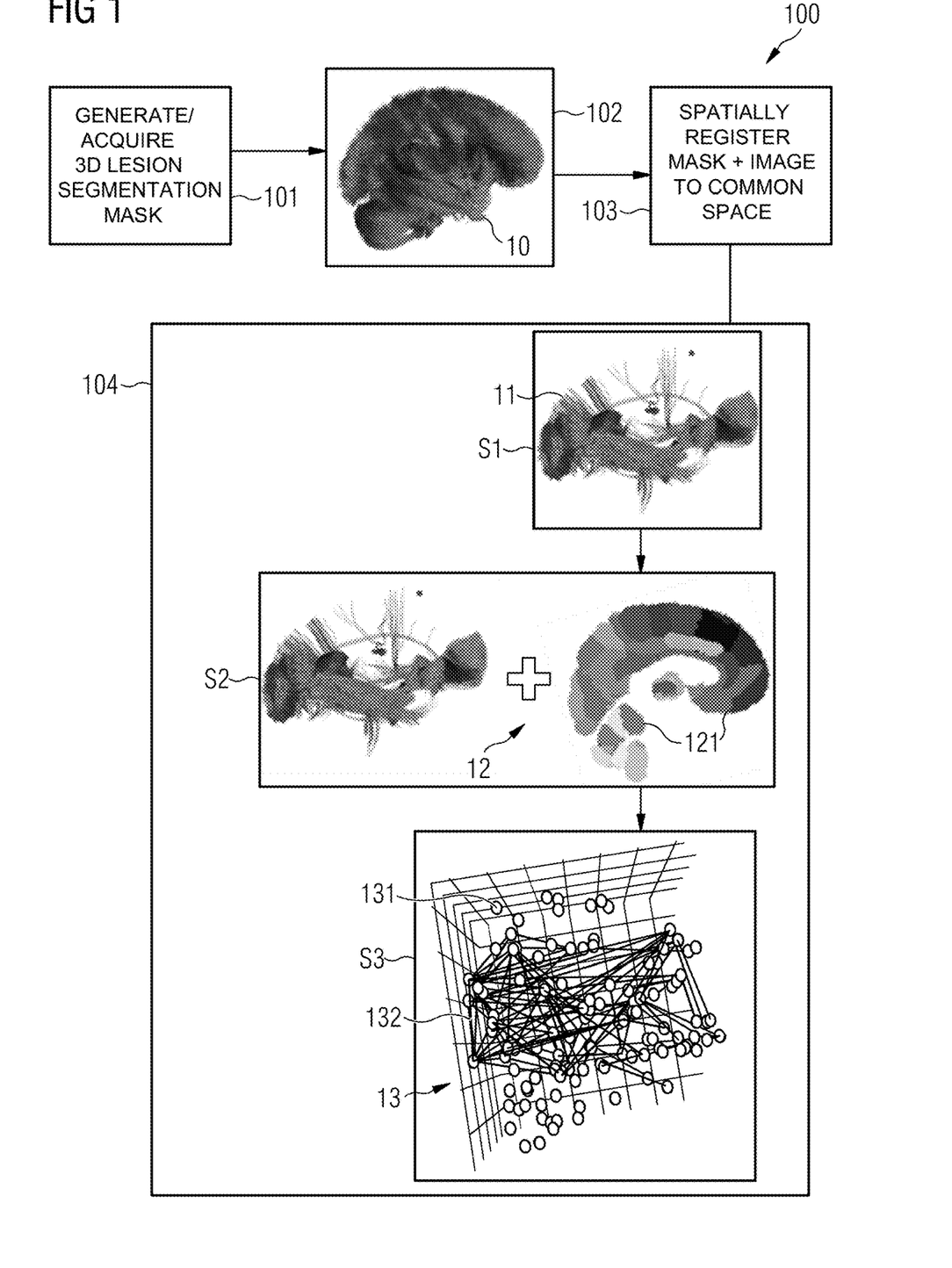
FIG. 1 illustrates a flowchart of a method according to the invention for characterizing structural brain disconnectomes.
Figure 2:
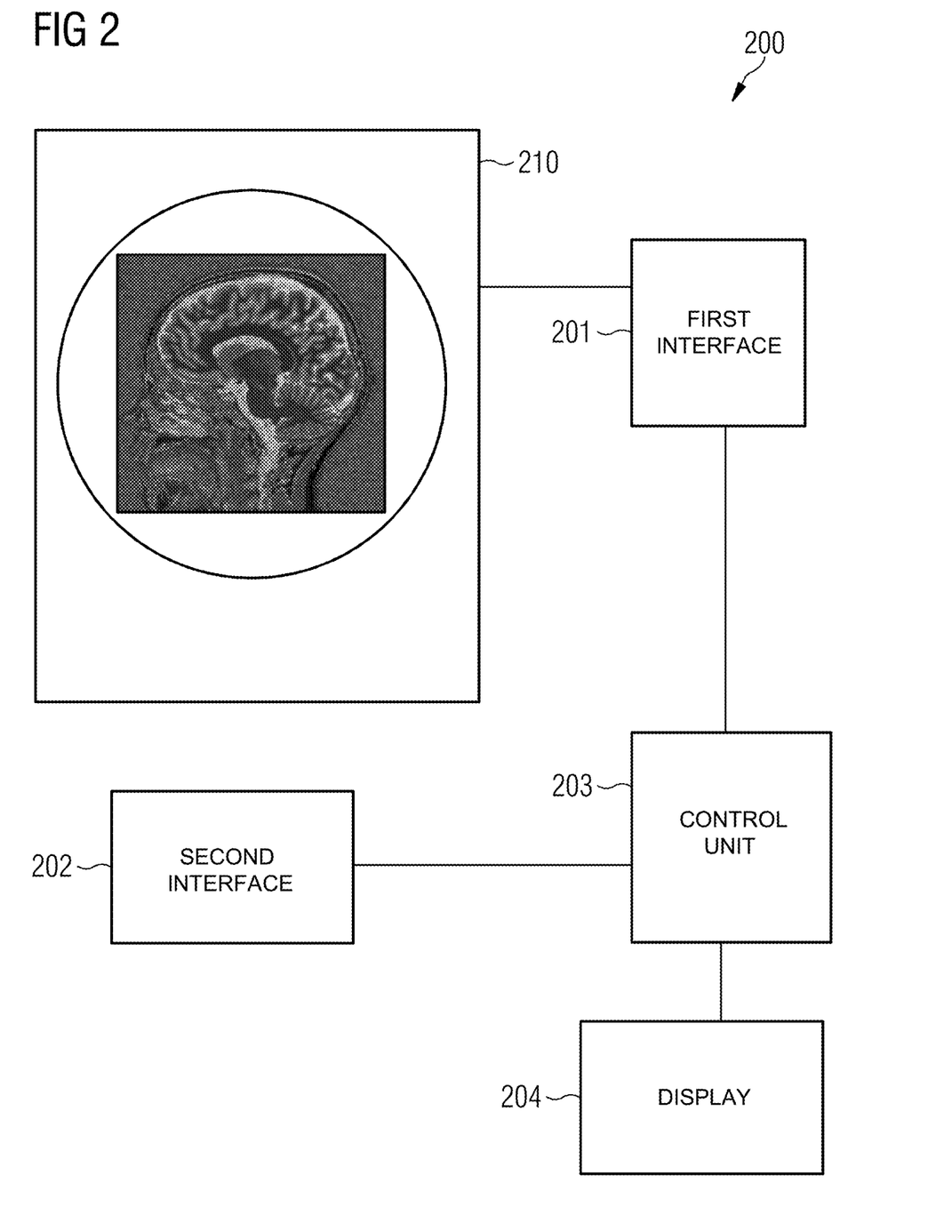
FIG. 2 illustrates a system for mapping connectivity damage instances, or disconnections in a brain according to the invention.

Referring now to the figures of the drawing in detail, there is described the method according to the invention. FIG. 1 describes the different steps of the method 100 carried out by a preferred embodiment of the system according to the invention which is illustrated by FIG. 2. For the purpose of illustration of the claimed method, FIG. 1 focuses on the specific construction of a structural disconnectome map in the form of a graph representing an estimated structural dysconnectivity for said brain.

At step 101, the system 200 according to the invention generates or acquires a 3D lesion segmentation mask through a first interface 201. This lesion segmentation mask might be obtained from MRI scans of a brain of a patient according to known techniques. For this purpose, the first interface 201 might be connected to an MRI apparatus 210 configured for providing 3D images of the patient brain, and comprising computing means enabling lesion segmentation.

At step 102, the system 200 receives or acquires, notably via a second interface 202, a brain tractography atlas 10.

At step 103, a control unit 203 connected to the first and second interfaces 201, 202, spatially registers, preferentially automatically, the lesion segmentation mask and a tractography atlas-based image to a common space. The tractography atlas-based image is an image extracted or obtained from the tractography atlas. It can be for instance the tractography atlas itself, i.e. the whole tractogram of the brain (i.e. a 3D image of nerve tracts usually spatially registered to a standard space), which is, according to the present invention, used for constructing a disconnectome graph, or a TDI extracted from the tractography atlas and preferentially used for constructing a white matter tract damage map. Preferentially, the control unit 203 registers the lesion segmentation mask to the space of the tractography atlas 10, said space being therefore chosen as common space.

At step 104, the control unit 203 is configured for automatically constructing a connectivity damage brain map. Said step 104 may comprise, in the case of representing the impact of brain lesions with disconnectomes, i.e. through the structural dysconnectivity of the brain, the following steps, performed automatically by the control unit 203:

at step S1, the control unit 203 superimposes the lesion mask onto said tractography atlas (i.e. whole brain tractogram) and identifies from said superimposition streamlines intersecting the lesion mask. Said streamlines intersecting the lesion mask are streamlines affected by a lesion, and are therefore called the "affected streamlines" 11. Only the affected streamlines 11 are then used for the next steps;

at step S2, the control unit 203 is configured for segmenting a 3D image of said brain using a parcellation atlas in order to obtain a partitioned patient brain 12, wherein said brain is partitioned/subdivided into different subregions 121. The subregions 121 define notably sub-volumes of the brain, each characterizing for instance a structure and/or function of the brain. The control unit 203 is further configured for identifying the brain subregions interconnected by the affected streamlines. For each couple of identified subregions that are interconnected, the control unit 203 further determines the number of affected streamlines that interconnect the subregions of the subregion couple;

at step S3, the control unit constructs a disconnectome graph 13, wherein said disconnectome graph 13 is a brain graph $G_{dis}$ comprising vertices $V_i$ 131 and edges $E_{dis}(i,j)$ 132, wherein vertices $V_i$ 131 represent the identified brain subregions "i" and each edge $E_{dis}(i,j)$ 132 that interconnect a pair i, j of vertices 131 represent the number of affected streamlines interconnecting the corresponding couples of subregions. Preferentially, the control unit 203 is also configured for modelling the tractography atlas as a brain graph $G_{atlas}$ with vertices $V_i$ and edges $E_{atlas}(i,j)$ representing the number of streamlines connecting two of said subregions in an average healthy subject.

Preferably, the control unit 203 is configured for weighing each vertex of $G_{dis}$ by a relative percentage of affected streamlines RAS computed as:

$$RAS(i) = \frac{\sum_{j \in v_i} \sum_{dis} (i,j)}{\sum_{j \in v_i} \sum_{atlas} (i,j)}$$

with $V_i$ being the set of neighboring vertices connected to a vertex i.

Preferably, the control unit 203 is further configured for creating a graph $G_c$ of preserved connectivity by combining $G_{dis}$ and $G_{atlas}$ such as:

$$E_c(i, j) = \begin{cases} 0, & \text{if } E_{atlas}(i, j) = 0 \\ \dfrac{E_{atlas}(i, j) - E_{dis}(i, j)}{E_{atlas}(i, j)}, & \text{otherwise} \end{cases}$$

Figure 3:
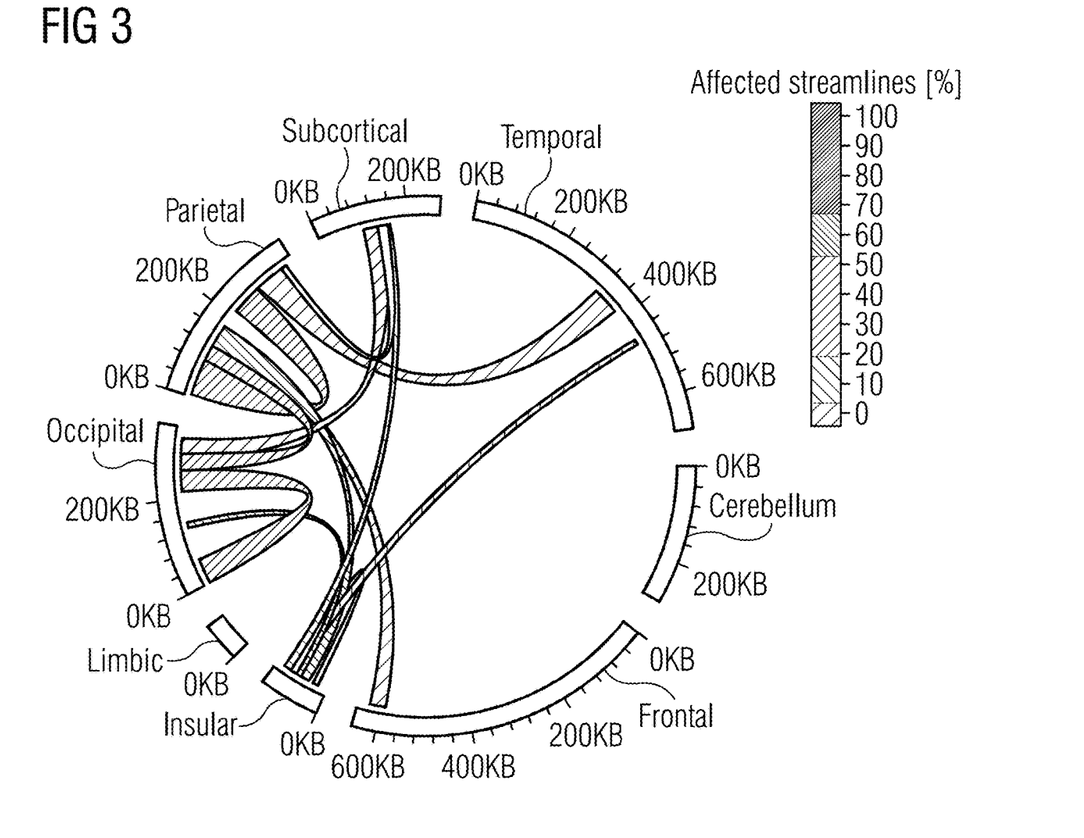
FIG. 3 provides a visual representation of a disconnectome graph according to the invention.

For representation purposes on a display 204 of the system according to the invention, the control unit 203 is further configured for grouping the brain subregions, i.e., the parcellation areas, into the main brain lobes and for computing the overall inter- and intra-lobes affected connections. FIG. 3 shows for instance an intuitive visual representation of an individual's disconnectome graph that might be displayed by the control unit 203 on the display 204.

According to the present invention, step 104 might be configured for mapping damaged tracts within the brain. For this purpose, the control unit 203 is configured for performing a tract-based analysis comprising an estimation of the tract damage on the white matter tracts composing the tractography atlas. The specification uses the term damage as a singular or plural term, meaning breaks, connection breaks, disconnections, local or spot deteriorations, etc. Notably, the control unit 203 is configured for extracting TDI for each tract and for superimposing, preferentially within the patient brain space, the TDI with the brain lesion mask using for instance a non-linear B-spline interpolation spatial registration. Metrics are preferentially automatically calculated by the control unit 203 for reflecting brain damage instances as the overlap between mask lesions and tracts, wherein a percentage and/or volume of lesion tracts is determined by the control unit 203 according to $$\text{Percentage of lesioned tract: } \frac{\sum_{o \in O} p_T(o)}{\sum_{t \in T} p_T(t)}$$

$$\text{Volume of lesioned tract: } \sum_{o \in O} p_T(o) * v$$

with O being the set of voxels in the overlap, T the set of voxels in the tract, p(i) the tract density at voxel i and v the volume of a voxel.

It will be readily understood that, apart from the above-mentioned percentage and volume, other metrics can be derived which might have similar clinical meaning.

Figure 4A:
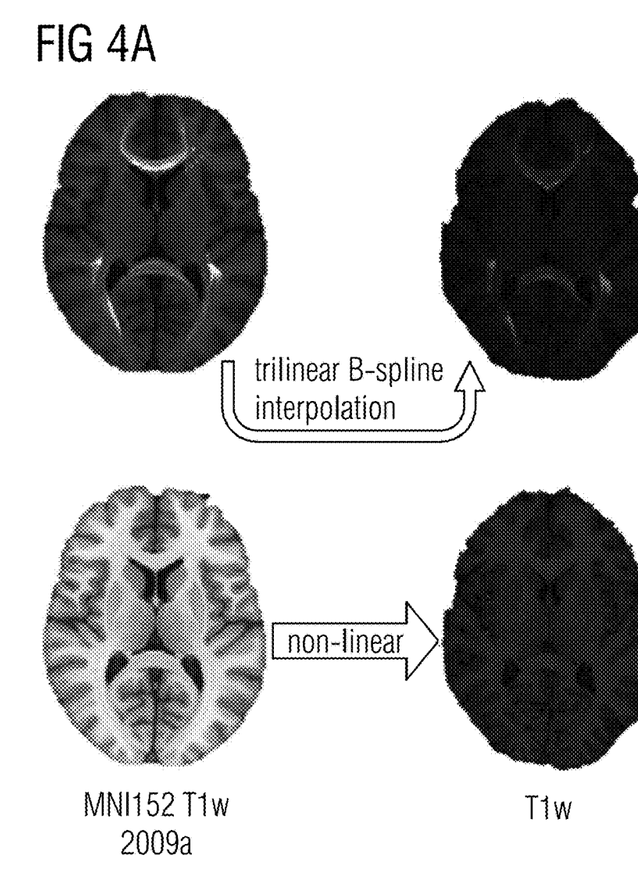
FIGS. 4A and 4B show a tract damage estimation map obtained according to the present invention.
Figure 4B:
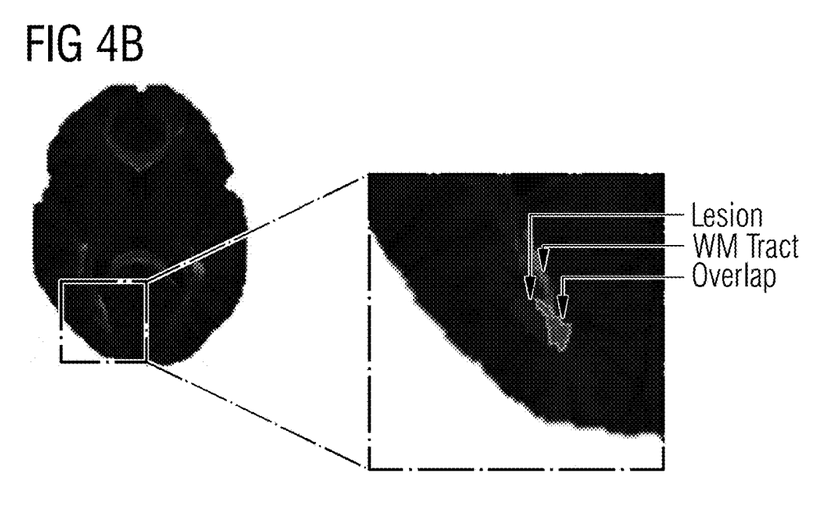

FIG. 4 summarizes step 104 for mapping tract damage instances and shows a typical result obtained for tract damage estimation. Step A of FIG. 4 shows the spatial registration of tract density maps to a brain patient space, e.g., an individual T1w space, with a non-linear transformation computed on the MR images (two bottom images), and applied to the TDI (two top images) using trilinear B-spline interpolation. Step B of FIG. 4 shows the overlap of the tract density map with the lesion mask enabling the control unit 203 to quantify the brain damage.

Finally, the previously described invention presents the following advantages with respect to prior art techniques:

it automatically creates a connectivity damage brain map that provides an estimation of brain connectivity and/or tract damage from standard clinical routine rather than requiring additional diffusion imaging;

due to the use of a tractography atlas, as opposed to individual tractography, it allows a better interpretability and more reliable quantitative analyses;

it benefits from an extremely fine level of definition of the white matter tracts coming from the tractography atlas, which would be hard to reach with clinical diffusion data;

the control unit is configured for extracting from the created disconnectome as a graph quantitative metrics that characterize the overall connectivity rather than analyzing single connections separately.

LIST OF CITATIONS

[1] Charil, Arnaud et al. "Statistical mapping analysis of lesion location and neurological disability in multiple sclerosis: application to 452 patient data sets". Neuroimage 19.3 (2003):532-544.
[2] Vellinga, M M et al. "Clinical correlations of brain lesion distribution in multiple sclerosis". Journal of Magnetic Resonance Imaging: An Official Journal of the International Society for Magnetic Resonance in Medicine 29.4 (2009): 768-773.
[3] Riahi, F et al. "Improved correlation between scores on the expanded disability status scale and cerebral lesion load in relapsing-remitting multiple sclerosis. Results of the application of new imaging methods." Brain: a journal of neurology 121.7 (1998):1305-1312.
[4] Bodini, Benedetta, Marco Battaglini, et al. "T2 lesion location really matters: a 10 year follow-up study in primary progressive multiple sclerosis". Journal of Neurology, Neurosurgery & Psychiatry 82.1 (2011):72-77.
[5] Rudick, R A et al. "Use of the brain parenchymal fraction to measure whole brain atrophy in relapsing-remitting MS". Neurology 53.8 (1999):1698-1698.
[6] Azevedo, Christina J et al. "Thalamic atrophy in multiple sclerosis: a magnetic resonance imaging marker of neurodegeneration throughout disease". Annals of Neurology 83.2 (2018): 223-234.
[7] Tao, Guozhi et al. "Deep gray matter atrophy in multiple sclerosis: a tensor based morphometry". Journal of the Neurological Sciences 282.1-2 (2009): 39-46
[8] Cordani, Claudio et al. "Imaging correlates of hand motor performance in multiple sclerosis: A multiparametric structural and functional MRI study". Multiple Sclerosis Journal (2020)
[9] Krzywinski, Martin et al. "Circos: an information aesthetic for comparative genomics". Genome research 9.9 (2009): 1639-1645
[10] Yeh, Fang-Cheng, et al. "Population-averaged atlas of the macroscale human structural connectome and its network topology." NeuroImage 178 (2018): 57-68

The invention claimed is:

1. A computer-implemented method for mapping connectivity damage of a brain, the method comprising:
receiving a lesion segmentation mask for the brain;
receiving a tractography atlas, being an atlas built from diffusion MRI data of a plurality of healty subjects;
constructing a connectivity damage brain map by
(i) superimposing the lesion segmentation mask and a tractography atlas-based image; and
(ii) combining information from the lesion segmentation mask with information from the tractography atlas-based image;
wherein the tractography atlas-based image is an image obtained from the tractography atlas, and wherein the tractography atlas-based image and the lesion segmentation mask are registered to a common space.

2. The computer-implemented method according to claim 1, wherein the connectivity damage brain map is a disconnectome graph for the brain, the tractography atlas-based image is the tractography atlas itself, and the constructing step comprises:
superimposing the lesion mask onto the tractography atlas and identifying from the tractography atlas streamlines intersecting the lesion mask, wherein identified streamlines are "affected streamlines";
segmenting a 3D image of the brain using a parcellation atlas, the parcellation atlas being configured for partitioning the brain into distinct brain subregions, and identifying the brain subregions interconnected via at least one of the affected streamlines, and determining for each identified interconnected subregions a number of affected streamlines interconnecting the identified interconnected subregions;
constructing the disconnectome graph, the disconnectome graph being modelled as a brain graph with vertices and edges, the vertices representing the identified brain subregions and the edges of the brain graph representing the number of affected streamlines connecting one of the subregions to another one of the subregions.

3. The computer implemented method according to claim 2, further comprising: grouping the subregions into main brain lobes and calculating and displaying by a control unit for each main brain lobe a relative percentage of a number of affected streamlines connecting the respective main lobe to another main lobe with respect to a number of streamlines that would connect the respective main lobe to another main lobe for a population-averaged structural connectome obtained from the tractography atlas.

4. The computer-implemented method according to claim 1, wherein the connectivity damage brain map is a white matter tract damage map configured for estimating white matter tract damage instances for the brain, and the constructing step comprises:
extracting, for each tract composing the tractography atlas, a brain tract density image (TDI), with a tract density being defined as a number of streamlines per brain voxel;
superimposing each spatially registered TDI on the lesion mask obtained for the brain in order to identify voxels of the TDI affected by a lesion;
determining, from the superimposition, a percentage of a lesioned tract and/or a volume of a lesioned tract, wherein the percentage of a lesioned tract is defined as a ratio between:
a sum over the affected voxels of the tract density for the considered voxel; and
a sum over a set of voxels of the tract of the tract density for the considered voxel;
defining a volume of a lesioned tract as the sum over the affected voxels of the tract density for the considered voxel times a volume of the considered voxel; and
creating a map of one or both of the percentage or the volume of lesioned tract.

5. A system for mapping connectivity damage of a brain, said system comprising:
a first interface for receiving or acquiring a lesion segmentation mask for the brain;
a memory for storing the lesion segmentation mask;
a second interface configured for acquiring or receiving a tractography atlas, the tractography atlas being an atlas built from diffusion MRI data of a plurality of healty subjects;

a control unit having a processor, said control unit being configured for spatially registering the lesion segmentation mask and a tractography atlas-based image to a common space, said control unit being further configured for automatically constructing a connectivity damage brain map from superimposing the lesion segmentation mask and the tractography atlas-based image, and from combining information from the lesion segmentation mask with information from the tractography atlas-based image, wherein the tractography atlas-based image is an image obtained from the tractography atlas; and a display connected to said control unit and configured for displaying the connectivity damage brain map construed by said control unit.

6. The system according to claim 5, where said first interface is connected to a magnetic resonance imaging (MRI) apparatus for acquiring images of the brain.

* * * * *